No. 608,989. Patented Aug. 9, 1898.
L. McK. MARSH.
DEVICE FOR TIGHTENING TIRES.
(Application filed Jan. 3, 1898.)
(No Model.)
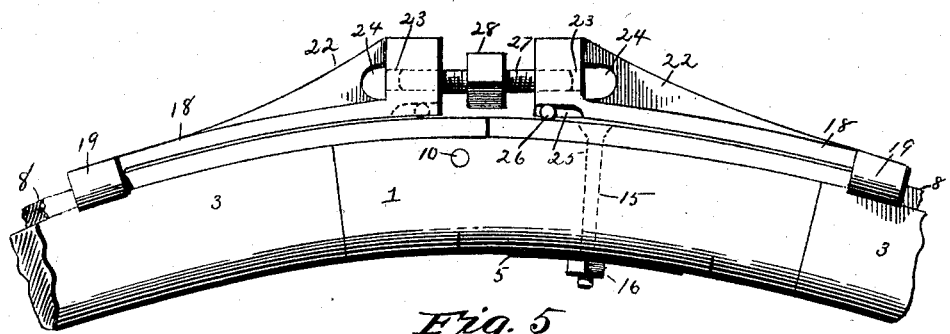
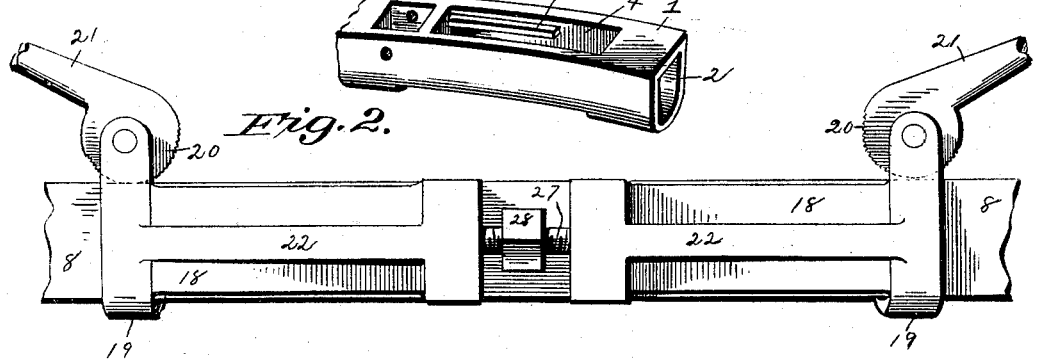
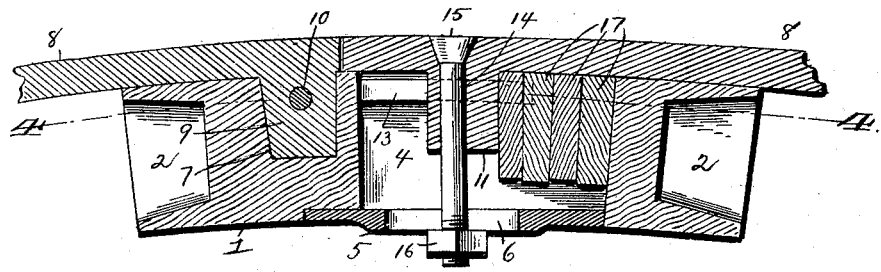
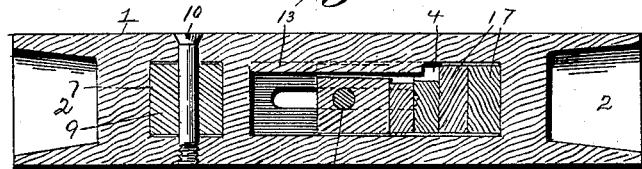
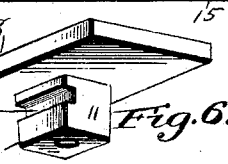
Witnesses: Inventor:

UNITED STATES PATENT OFFICE.

LEONARDO McKEEL MARSH, OF WARRENSBURG, MISSOURI.

DEVICE FOR TIGHTENING TIRES.

SPECIFICATION forming part of Letters Patent No. 608,989, dated August 9, 1898.

Application filed January 3, 1898. Serial No. 665,408. (No model.)

*To all whom it may concern:*

Be it known that I, LEONARDO McKEEL MARSH, a citizen of the United States, residing at Warrensburg, in the county of Johnson and State of Missouri, have invented certain new and useful Improvements in Devices for Tightening Tires; and I do hereby declare the following to be a full, clear, and exact description of the invention, such as will enable others skilled in the art to which it appertains to make and use the same.

My invention has relation to devices for drawing or tightening tires on wheel-rims; and it consists in the novel construction and arrangement of its parts, as hereinafter described.

The object of the invention is to provide a tire adapted to surround the wheel-rim, the ends of the tire being disconnected from each other, one end being permanently fixed to a block, the said block being located between the ends of two adjacent fellies, forming a portion of the wheel-rim, the other end of the tire being adapted to be adjustably attached to the said block.

In the accompanying drawings, Figure 1 is a side elevation of a portion of the wheel-rim, showing the block located in position between the ends of the fellies and showing a means for drawing the ends of the tire together. Fig. 2 is a top plan view of a device as shown in Fig. 1. Fig. 3 is a longitudinal sectional view of the ends of the tire and the block. Fig. 4 is a horizontal sectional view of the block cut on the line 4 4 of Fig. 3. Fig. 5 is a perspective view of the block. Fig. 6 is a perspective view of one end of the tire, and Fig. 7 is a perspective view of one of the wedges used in the block.

The block 1 is provided at each end with a socket 2, the said sockets being adapted to receive the ends of the fellies 3, the block 1 thus being in alinement with the fellies 3 3 and forming a portion of the wheel-rim. The block 1 is provided with the substantially rectangular aperture 4, said aperture extending perpendicularly through the block. The plate 5 is adapted to close one end of the aperture, the said plate being provided with an elongated perforation 6. The block 1 is provided on its outer face with the recess 7, and the tire 8 is provided at one end with a projection 9, the said projection 9 being adapted to enter the recess 7, the cross-pin 10 securing the end of the tire 8 permanently to the block 1. The opposite end of the tire 8 is provided with an inclined projection 11, the said projection being adapted to enter the aperture 4 of the block 1. The projection 11 is provided on one side with the groove 12, the said groove being adapted to receive the flange 13, the said flange 13 being located on one of the perpendicular walls of the aperture 4, the said flange extending nearly the entire length of the said aperture. A perforation 14 passes through the projection 11 and the end of the tire 8, and the bolt 15 is adapted to enter said perforation 14, the opposite end of the bolt passing through the elongated perforation 6 of the plate 5 and being secured by means of a tap 16. The wedges 17 are interposed between one side of the projection 11 and one end of the walls of the aperture 4, and thus the movable end of the tire 8 is held in its proper position. Some or all of the wedges 17 may be cut away, as at 18, (see Fig. 7,) in order that the lower ends of the wedges may pass beyond the flange 13.

In assembling the tire on the wheel the projection 9 is permanently secured in place in the recess 7. The tire is then carried around the rim and the projection 11 is slipped in the aperture 4 at the end of the flange 13. The free end of the tire is then moved laterally toward the secured end, and the groove 12 receives the flange 13, and thus the movable end of the tire is retained perpendicularly. The wedges 17 are then interposed in place and thus the movable end of the tire is prevented from moving in any direction. When the movable end is secured, the bolt 15 is inserted in the perforation 14, and the bolt 5 is placed in position and is retained in its proper place by means of the tap 16, carried by the threaded end of the bolt 15. Any suitable device may be provided for drawing the ends of the tire together, and as an illustration of such a device I will now describe a form of such device as shown in the drawings. The clamps 18 are provided. The said clamps are provided at their outer ends with a downwardly-extending lug 19 and at the opposite side with an eccentric 20, horizontally journaled to the end of the clamp. The eccentric 20 is provided with the handle or lever 21, and the edge of the eccentric is preferably milled or roughened, as illustrated in Fig. 2. A perpendicular web 22 is located on the clamp 18, the said web strengthening the clamp. The forward end of each clamp is provided with a horizontal internally-threaded perforation 23, and the web 22 just behind the perforation 23 is provided with an opening 24. The under surface of the clamp is provided with a recess 25, in which is located a roller 26 or other antifrictional device. The right and left threaded bolt 27 is adapted to enter at its opposite ends the perforations 23 of the opposite clamps 18. The bolt 27 is provided at an intermediate section with a squared portion 28, and by applying a wrench to the said squared section 28 the said bolt 27 may be turned and the clamps 18 drawn together or pushed apart. The lug 19 passes down along one edge of the tire 8, and the eccentric 20 when turned comes in contact with the opposite edge of the said tire. Thus the clamps 18 are made fast to the tire. Then by turning the bolt 27, as above described, the said clamps 18 may be drawn together, and as they are drawn together suitable wedges are inserted in their proper places in the aperture 4 of the block 1. The openings 24 are provided in the webs 22 of the clamps 18 in order that the ends of the bolt 27 may pass entirely through the perforations 23 of the said clamps should it be necessary to bring the clamps very close together, the further advantage being that any dirt located in the threads of the perforations 23 will be pushed out at the rear ends of the said perforations and thus the perforations will not become clogged up.

Having thus described my invention, what I claim as new, and desire to secure by Letters Patent, is—

1. A tire-tightener consisting of a block forming a portion of the wheel-rim, a tire fixed at one end to said block, said block having an aperture, the opposite end of the tire having a projection adapted to enter said aperture, wedges adapted to be interposed between said projection and a wall of the aperture, and a suitable means for drawing the ends of the tire together.

2. A tire-tightener consisting of a block adapted to form a portion of the wheel-rim, said block having an aperture, a tire fixed at one end to the said block, the said tire having at its opposite end a protrusion adapted to enter the aperture of the block, wedges adapted to be interposed between said protrusion and a wall of the aperture, a bolt passing through the tire and being secured at its inner end to the block, and a suitable means for drawing the ends of the tire together.

3. A tire-tightener consisting of a block adapted to form a portion of the wheel-rim, said block having an aperture, and a recess located in its outer face, a protrusion adapted to enter said recess, a means for securing the said protrusion in the recess, the tire having at its opposite end a second protrusion, the said second protrusion adapted to enter the aperture of the block, wedges adapted to be interposed between the said second protrusion and a wall of the aperture and a suitable means for drawing the ends of the tire together.

4. A tire-tightener consisting of a block adapted to form a portion of the wheel-rim, a tire fixed at one end to said block, said tire having at its opposite end a protrusion, said protrusion having a horizontal groove, the said block having an aperture, a flange located in said aperture, the projection of the tire adapted to enter said aperture, the groove of the projection receiving the flange, wedges adapted to be interposed between the protrusion and a wall of the aperture and a suitable means for drawing the ends of the tire together.

5. A device for tightening tires consisting of a block having an aperture, a tire fixed at one end to said block, the opposite end of the tire having a protrusion, adapted to enter the aperture of the block, said protrusion having a horizontal groove, a flange located in the aperture of the block, said flange extending nearly the entire length of the aperture, the groove of the protrusion adapted to receive the said flange, wedges adapted to be interposed between the protrusion and a wall of the aperture and a suitable means for drawing the ends of the tire together.

6. A device for tightening tires consisting of a block adapted to form a portion of the wheel-rim, said block having an aperture, a tire fixed at one end to said block and having at its opposite end a projection, said projection adapted to enter the aperture of the block, wedges adapted to be interposed between the said projection and a wall of the aperture, a removable perforated plate closing one end of the aperture, a bolt passing through the tire and through the perforation in said plate and being secured at its inner end to said plate, and a suitable means for drawing the ends of the tire together.

7. A device for tightening tires consisting of a block adapted to form a portion of the wheel-rim, said block having an aperture, a tire fixed at one end to said block, and having at its opposite end a protrusion adapted to enter said aperture, wedges adapted to be interposed between said protrusion and a wall of the aperture, a removable plate having an elongated perforation, said plate adapted to close one end of the aperture, a bolt passing through the tire and through the elongated perforation of the plate, said bolt being secured at its inner end to the plate and a suitable means for drawing the ends of the tire together.

8. A device for tightening tires consisting of a block adapted to form a portion of the wheel-rim, said block having an aperture, a tire fixed at one end to said block and having at its opposite end a protrusion adapted to enter the aperture of the block, the said protrusion having a horizontal groove, a horizontal flange located in the aperture and adapted to enter the groove of the protrusion, wedges adapted to be interposed between the protrusion and a wall of the aperture, said wedges having at their lower ends cut-out sections and thus adapted to pass beyond the flange located in the aperture and a suitable means for drawing the ends of the tire together.

9. A device for tightening tires consisting of a block forming a portion of the wheel-rim, a tire attached at its ends to said block, a means for drawing the ends of the tire together, consisting of clamps, each said clamp having a lug adapted to come in contact with one edge of the tire and an eccentric adapted to come in contact with the opposite edge of the tire and a suitable means for drawing said clamps together.

10. A device for tightening tires consisting of a block forming a portion of the wheel-rim, a tire attached at its ends to said block, means for drawing the ends of the tire together consisting of clamps adapted to grasp the tire, said clamps having at their ends threaded perforations, a threaded bolt adapted to enter said perforations and a suitable means for turning said bolt and thus drawing the clamps together.

11. A device for tightening tires consisting of a block adapted to form a portion of the wheel-rim, a tire attached at its ends to said block, a means for drawing the ends of the tire together consisting of clamps adapted to grasp the tire, said clamps having at their ends threaded perforations, perpendicular webs extending longitudinally of the clamps, a threaded bolt adapted to enter the threaded perforations of the clamps and a suitable means for turning said bolt and thus bringing the clamps together.

12. A device for tightening tires consisting of a block adapted to form a portion of the wheel-rim, a tire attached at its ends to said block, a means for drawing the ends of the tire together consisting of clamps adapted to grasp the tire, said clamps having at their ends internally-threaded perforations, perpendicular webs extending longitudinally of the clamps, said webs having behind the perforations openings, a threaded bolt adapted to enter the threaded perforations of the clamps and a means for turning said bolt and thus bringing the ends of the clamps together.

13. A device for tightening tires consisting of a block adapted to form a portion of the wheel-rim, the tire attached at its ends to said block, a means for drawing the ends of the tire together, said means consisting of clamps adapted to grasp the tire, antifrictional devices interposed between the tire and the clamps and a suitable means for drawing the clamps together.

In testimony whereof I affix my signature in presence of two witnesses.

LEONARDO McKEEL MARSH.

Witnesses:
JOHN CRUTCHFIELD,
MAGNUS J. PRUSSING.